(12) United States Patent
Lu

(10) Patent No.: US 7,783,918 B2
(45) Date of Patent: Aug. 24, 2010

(54) DATA PROTECTION METHOD OF STORAGE DEVICE

(75) Inventor: Ying-Chih Lu, Taipei (TW)

(73) Assignee: Inventec Corporation, Taipei (TW)

( * ) Notice: Subject to any disclaimer, the term of this patent is extended or adjusted under 35 U.S.C. 154(b) by 802 days.

(21) Appl. No.: 11/675,490

(22) Filed: Feb. 15, 2007

(65) Prior Publication Data

US 2008/0201600 A1    Aug. 21, 2008

(51) Int. Cl.
G06F 11/00 (2006.01)
(52) U.S. Cl. .......................................... 714/7
(58) Field of Classification Search .................. 714/5–8
See application file for complete search history.

(56) References Cited

U.S. PATENT DOCUMENTS 7,421,525 B2 * 9/2008 Polzin et al. ................ 710/100
2006/0206764 A1 * 9/2006 Lu et al. ....................... 714/36
2008/0059820 A1 * 3/2008 Vaden et al. ................ 713/320
2008/0120486 A1 * 5/2008 Ritz et al. .................... 711/173

* cited by examiner

*Primary Examiner*—Bryce P Bonzo
(74) *Attorney, Agent, or Firm*—J.C. Patents

(57) ABSTRACT

A data protection method of a storage device is provided. In the method, a system management interrupt program orders a hardware control unit to obtain a type and an address message of an error in a block in a first storage device, and stores the type and address message in a second storage device. An interrupt service routine (ISR) reads the type and address message of the error from the second storage device. The ISR orders an operating system to search for a block that may be accessed normally and not damaged in the first storage device, and sets the block as a reserved block. The ISR transmits the address message of the error to the OS, such that the OS copies the data in the block having the error to the reserved block, thereby increasing the available capacity of the storage device and improving the reliability of the computer.

9 Claims, 2 Drawing Sheets

| Type | Description |
|---|---|
| 0 | Correct error under standard mode |
| 1 | Un-correct error under standard mode |
| 2 | Correct error at normal DIMM under mirror mode |
| 3 | Correct error at mirror DIMM under mirror mode |
| 4 | Un-correct error at normal DIMM under mirror mode |
| 5 | Un-correct error at mirror DIMM under mirror mode |

FIG. 3

DATA PROTECTION METHOD OF STORAGE DEVICE

BACKGROUND OF THE INVENTION

1. Field of the Invention

The present invention relates to a data protection method of a storage device. More particularly, the present invention relates to a data backup method applied in a memory of a computer.

2. Description of Related Art

With economic booming and the development of science and technology, various computers and servers become increasingly popular. However, the memory plays an extremely important role in the computer and the server, and influences system performance more than in the past. Only 1 bit error occurred in the memory will cause the data to be incorrect or lost, thereby seriously puzzling consumers.

A conventional data storage technology of a dual in-line memory module (DIMM) employs three modes to backup data, namely, a standard mode, a spare mode, and a mirror mode. In the standard mode, all DIMMs are mapped to memory spaces and a basic input/output system (BIOS) reports the mapped memory spaces to an operating system (OS), such that the OS may learn and manage the memory spaces of all the DIMMs. In the spare mode, a part of the DIMMs are used as a spare memory, and only the rest DIMMs are mapped to memory spaces. In addition, in the mirror mode, one half of DIMMs are used as a mirror DIMM, and then these two parts of DIMMs are mapped to the same memory space. That is, only one half of the memory can be accessed by the OS. However, in spite of the high reliability, the spare mode and the mirror mode should occupy a part or a set of memories with the same capacity for backup, and results in that only a part of memory capacity can be accessed, thereby wasting money and memory.

Therefore, at present, how to prevent the data for backup from occupying the memory space that reduces the available capacity of the memory has become a serious problem.

SUMMARY OF THE INVENTION

In view of the disadvantages of the conventional art, the present invention is mainly directed to provide a data protection method of a storage device. The message of a damaged block of the storage device is recorded and the data is backed up according to the message, thereby increasing the available capacity of the storage device and improving the reliability of a computer.

As embodied and broadly described herein, the present invention provides a data protection method of a storage device, which is applied in a computer. The computer is at least composed of a first storage device, a second storage device, an interrupt service routine (ISR), a hardware control unit, a system management interrupt (SMI) program, and an operating system (OS). The first storage device is consisted of a plurality of blocks. The data protection method includes the following steps.

The SMI program orders the hardware control unit to obtain a type and an address message of a block having an error in the first storage device, and stores the message in the second storage device.

The ISR reads the type and the address message of the error in the first storage device from the second storage device.

The ISR orders the OS to search for a block which may be accessed normally and not damaged in the first storage device, and sets the block as a reserved block.

The ISR transmits the address message of the error in the block having the error in the first storage device to the OS, such that the OS copies the data in the block having the error in the first storage device to the reserved block.

In addition, the data protection method further includes marking the block having the error as a damaged block, and when the first storage device has no available blocks, the OS uses a disk to simulate a virtual memory to be used as a memory.

To sum up, in the data protection method of the storage device provided by the present invention, when an error occurs during data is being accessed, the type and address of the block having the error are recorded using a system interrupt mechanism and the data in the block having the error is backed up to another reserved block accordingly, so as to certainly improve the reliability of the computer and to increase the available capacity of the memory of the computer.

BRIEF DESCRIPTION OF THE DRAWINGS

FIG. 3 is a defining diagram of the type of the error of the memory of the data protection method of the storage device provided by the present invention.

DESCRIPTION OF EMBODIMENTS

In the following, the implementation method of the present invention is illustrated through specific embodiments, and those skilled in the art may easily understand other advantages and functions of the present invention from the content disclosed in the specification.

Figure 1:
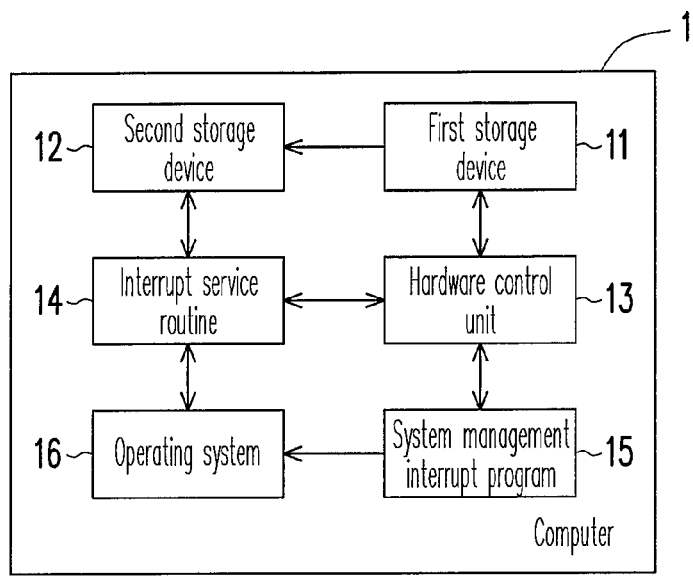
FIG. 1 is a block diagram of the architecture of a computer employing the data protection method of a storage device provided by the present invention.

Referring to FIG. 1, a block diagram of a computer employing a data protection method of a storage device provided by the present invention is shown. As shown in FIG. 1, the computer 1 is composed of a first storage device 11, a second storage device 12, an ISR 14, a hardware control unit 13, an SMI program 15, and an OS 16. It is necessary to illustrate that the computer 1 employing the data protection method of a storage device provided by the present invention further has other various functional units, and in order to simplify the drawings and the illustration, only the components relevant to the present invention are shown in the architecture in FIG. 1, while other components (for example the input and output devices) are not. The computer 1 is, for example, a personal computer or a server, and the hardware control unit 13 is, for example, a north bridge control chip. In addition, the SMI program 15 is, for example, a service program in a basic input/output system (BIOS).

During booting, the BIOS (not shown) sets and detects the basic functions of the first storage device 11. For example, the BIOS obtains the storage capacity and the memory type of the storage device 11. After it is assured that the first storage device 11 may run normally, an interrupt generation function of the first storage device 11 is enabled, and then the OS 16 is loaded. The first storage device 11 is a dual in-line memory module (DIMM).

Next, when the OS 16 accesses the DIMM, a memory control hub (MCH) (located in the north bridge chip, and not shown) automatically detects and determines whether the first storage device 11 generates an un-correct error or a correct error, and generates an interrupt signal when an error is detected. The OS 16 is a Microsoft windows OS or a Unix system.

Figure 2:
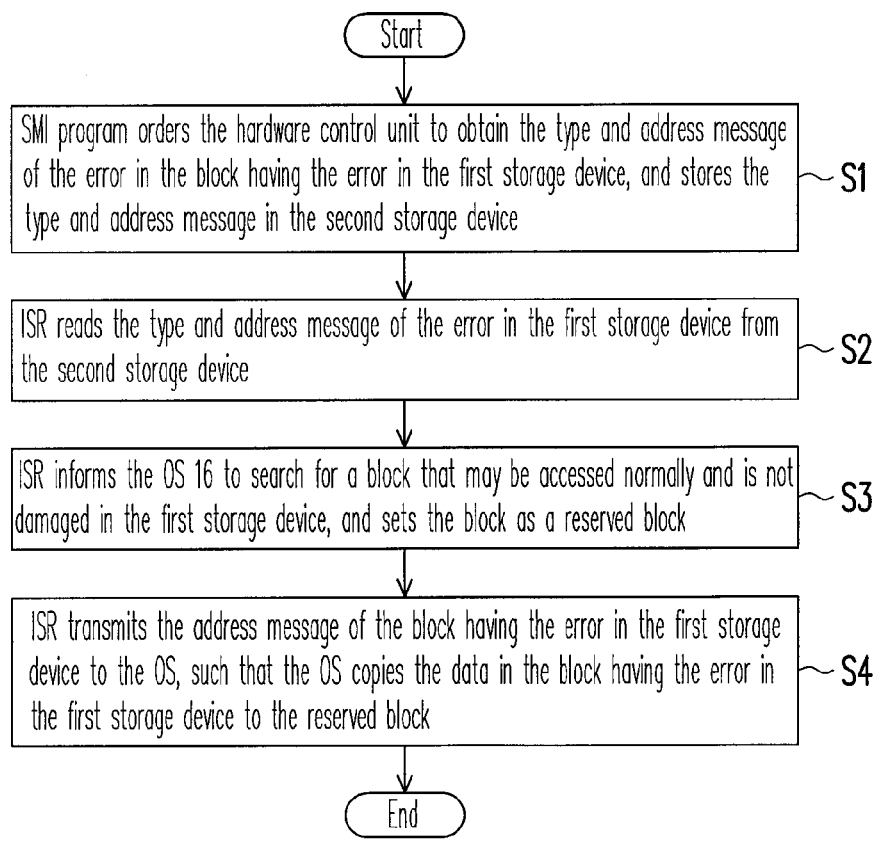
FIG. 2 is a flow chart of the data protection method of the storage device according to the first embodiment of the present invention.

Referring to FIG. 2, a flow chart of the data protection method of the storage device according to the first embodiment of the present invention is shown. As shown in the figure, after the computer 1 is powered on and the first storage device 11 and the hardware control unit 13 are initialized, the OS 16 is loaded. When the OS 16 begins to access the DIMM, and the un-correct error or the correct error occurs, the system immediately generates an SMI, signal to execute the SMI program 15. Here, the process is proceeded to Step S1. The SMI program 15 orders the hardware control unit 13 to obtain the type and address message of the error in the block having the error in the first storage device 11, and stores the type and address message in the second storage device 12. The hardware is set to generate an interrupt signal to execute the ISR 14. Then, the SMI program is terminated. Then, the process is proceeded to Step S2. The second storage device 12 is a non-volatile random access memory (NVRAM).

In Step S2, the ISR 14 reads the type and address message of the error in the first storage device 11 from the second storage device 12. Then, the process is proceeded to Step S3.

In Step S3, the ISR 14 informs the OS 16 to search for a block that may be accessed normally and not damaged in the first storage device 11, and sets the block as a reserved block. Then, the process is proceeded to Step S4.

In Step S4, the ISR 14 transmits the address message of the block having the error in the first storage device 11 to the OS 16, such that the OS 16 copies the data in the block having the error in the first storage device 11 to the reserved block.

In addition, the DIMM in the first embodiment is consisted of a plurality of blocks, each of which has the size of the capacity of 1 k bits, and the reserved block is a block that may be accessed normally and, not damaged in the first storage device 11.

Referring to FIG. 3, a defining table of the type of the error of the memory of the data protection method of the storage device provided by the present invention is shown. As shown in FIG. 3, six types of errors of the memory exist and are formed through arranging and combining, different parameters, i.e., a memory protection mode (a standard mode or a mirror mode), an error type (the correct error or the un-correct error), and a source object (a common DIMM or a mirror DIMM) stored when an error occurs. These types of error may be provided for the ISR 14 to determine the type of the error of the memory.

In the second embodiment of the present invention, a step is added following the flow of the data protection method in the first embodiment, that is, the block including the error bit data is marked as a damaged block, such that the user may identify normal blocks: and damaged blocks in the storage device.

Further, in the third embodiment of the present invention, a determination step is added following the flow of the data protection method in the first embodiment. The step is that when the first storage device 11 has no available blocks, i.e., all the normal blocks in the first storage device 11 have already been occupied, a disk (such as a hard disk) is used to simulate a virtual memory to be used by the OS 16 as a memory.

To sum up, in the data protection method of the storage device provided by the present invention, the type and the address message of an error in the block having the error are recorded and stored in another storage device, and the reserved block in the first storage device is searched, so as to copy the data in the block having the error in the first storage device to the reserved block. Therefore, the available capacity of the storage device is increased and the reliability of the computer is improved.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A data protection method of a storage device, applied in a computer, wherein the computer is at least composed of a first storage device, a second storage device, an interrupt service routine (ISR), a hardware control unit, a system management interrupt (SMI) program, and an operating system (OS), and the first storage device is consisted of a plurality of blocks, the data protection method comprising:
    ordering the hardware control unit to obtain a type and an address message of an error in a block having the error in the first storage device and storing the type and the address message in the second storage device using the SMI program;
    reading the type and the address message of the error in the first storage device from the second storage device using the ISR;
    ordering the OS to search for a block that is accessed normally and not damaged in the first storage device and setting the block as a reserved block using the ISR; and
    transmitting the error address message of the first storage device to the OS, such that the OS copies the data stored in the block having the error in the first storage device to the reserved block using the ISR, wherein
    when the first storage device has no available blocks, the OS uses a disk to simulate a virtual memory to be used as a memory.

2. The data protection method of a storage device as claimed in claim 1, further comprising marking the block having the error as a damaged block.

3. The data protection method of a storage device as claimed in claim 1, wherein the size of the blocks of the first storage device is 1 k bits.

4. The data protection method of a storage device as claimed in claim 1, wherein the first storage device is a dual in-line memory module (DIMM).

5. The data protection method of a storage device as claimed in claim 1, wherein the second storage device is a non-volatile random access memory (NVRAM).

6. The data protection method of a storage device as claimed in claim 1, wherein the SMI program is a service program in a basic input/output system (BIOS).

7. The data protection method of a storage device as claimed in claim 1, wherein the reserved block is a block that is accessed normally and not damaged in the first storage device.

8. The data protection method of a storage device as claimed in claim 1, wherein the hardware control unit is a north bridge control chip.

9. The data protection method of a storage device as claimed in claim 1, wherein at least six error types exist and are formed through arranging and combining a protection mode, a correct error type, and an error source object, wherein the protection mode is a standard mode or a minor mode, the correct error type is a correct error or an un-correct error, and the error source object is a common DIMM or a mirror DIMM.

* * * * *